Patented Mar. 16, 1948

2,437,764

UNITED STATES PATENT OFFICE 2,437,764

SPRINKLER CONTROL

John D. Spence, La Crescenta, Calif.

Application December 4, 1945, Serial No. 632,712

5 Claims. (Cl. 137—139)

The primary object of my invention is the provision of a sprinkler control means whereby the running time of the water flow may be predetermined, and when determined and adjusted to that time, given no further attention.

It is thus an object of the herein invention to provide a means whereby the water flow may be controlled to continue for such periods of time as may be desired, and when the designated time has elapsed, automatically discontinue flowing until manually started again for a like or other designated period of time as desired.

And a further object of the herein invention is the provision of a device equally suitable for the control of any desired controlled water flow for purposes other than sprinkling, and irrespective how and where employed.

Figure 1:
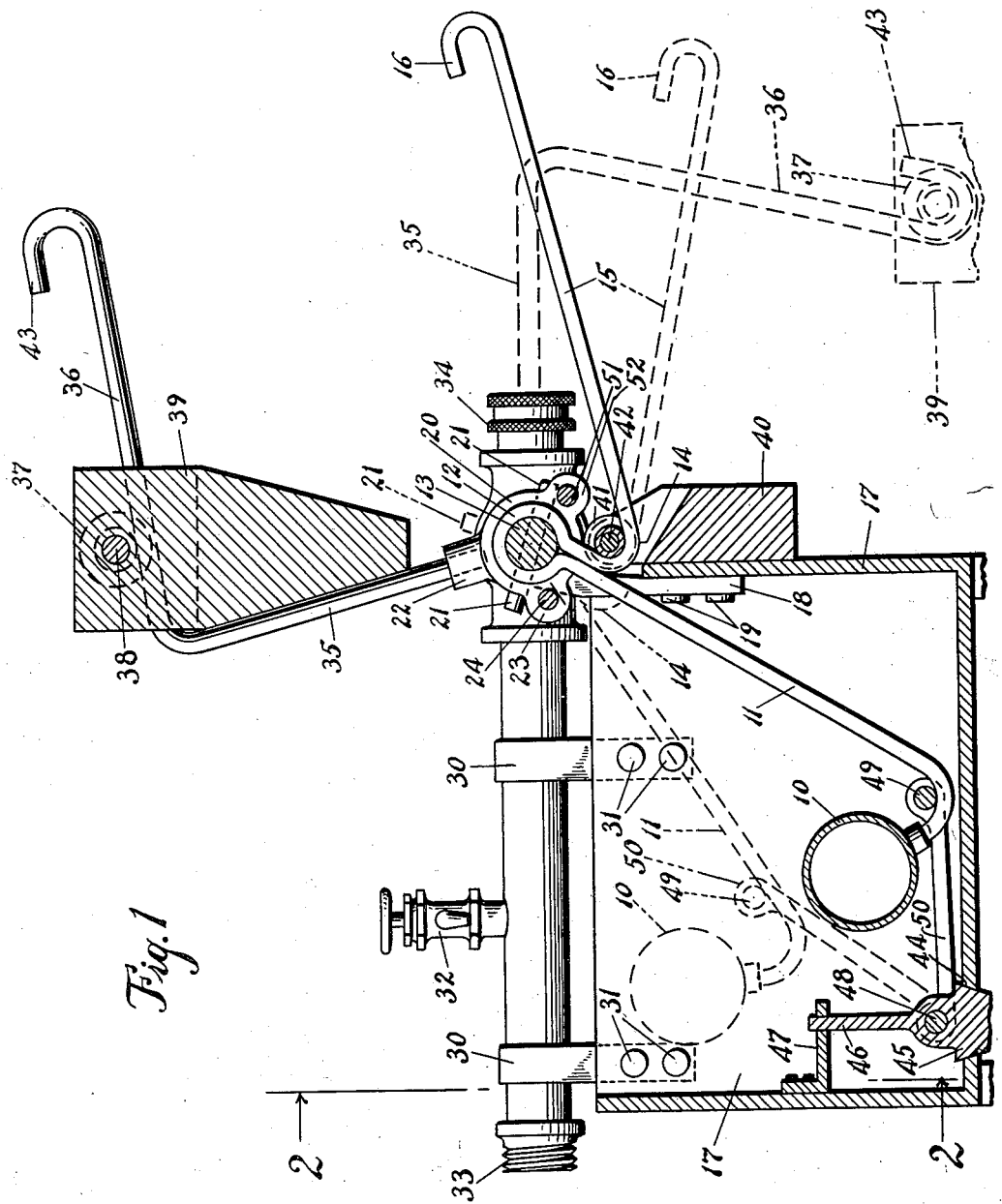
Figure 2:
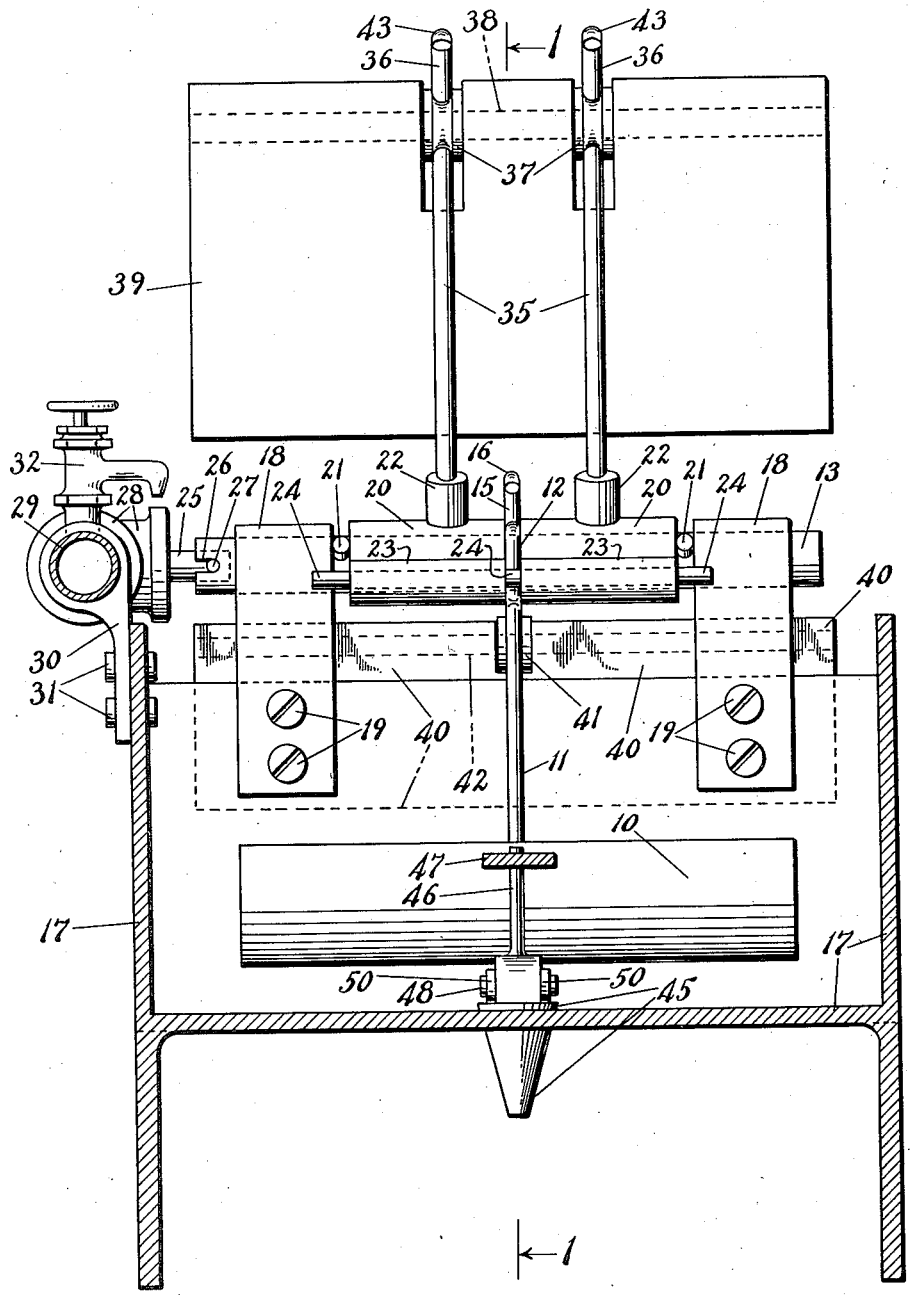

I attain these objects by the device illustrated in the accompanying drawing, in which:

Figure 1 is a vertical sectional view of the invention taken on line 1—1 of Fig. 2; and Figure 2 is a sectional view taken on line 2—2 of Fig. 1.

Similar numerals of reference indicate like parts throughout the views, and wherein a float 10 carried on one end of an arm 11 looped back upon itself forms a hub 12 journaled about a rocker shaft 13, but is not fixed thereto.

The rod forming the arm 11 is further bent after forming the hub 12 to form a loop 14 at the base of another arm 15. The latter returns upon itself at its outer end to form a hook 16.

The float 10 is positioned to ascend and descent within an uncovered box-like tank 17 having a pair of bracket bearings 18 secured as by screws 19 adjacent the upper edge of one wall of the tank 17 to provide a support for opposite ends of the rocker shaft 13.

The hub 12 is disposed midway the ends of the shaft 13, and a pair of sleeves 20 are journaled upon the shaft 13, one on each side of the hub 12 and between the bearings 18.

A pair of pins 21 are fixed diametrically through the shaft 13 so that one of said pins is positioned between each of the bearings 18 and its adjacent sleeve 20, thereby holding the shaft 13 and the parts supported thereon in a central position in relation to the bearings 18.

Each of the sleeves 20 is provided with an upstanding boss 22 and a horizontal boss 23.

A single pin 24 is fixed in a horizontal position through each of the bosses 23, thereby tying the sleeves 20 together as a movable unit. The pin 24 extends beyond the ends of the sleeves 20 so as to strike against the bearings 18, thereby providing limit-stops for the rotation of the sleeves 20.

One end of the shaft 13 is telescoped over one end of a valve-stem 25 and is also slotted as at 26 to engage a pin 27 carried by the valve stem 25. The latter is the operating stem of a valve 28 connected to one end of a pipe 29 carried by a pair of brackets 30 secured to one wall of the tank 17 as by rivets 31.

A smaller valve 32 is connected T-like into the pipe 29 to supply water into the tank 17 at definite periods as is hereinafter explained. The other end of the pipe 29 is provided with a male hose connector 33. A female hose connector 34 is connected into one side of the valve 28.

One end of a pair of rods 35 is fixed in each of the bosses 22. The rods are bent at right angles to provide a pair of weight supporting arms 36 on which are supported a pair of rollers 37 axially aligned on a common shaft 38 fixed in a weight 39, thereby slidably supporting the weight 39 on the arms 36. The arms 35 and 36 provide an angular crank member for turning the shaft.

Another weight 40 provided with a roller 41 journaled upon a pin 42 fixed in the weight 40 is disposed to ride on the arm 15.

One end of the arms 36 is bent upon themselves to form a hook 43.

An orifice 44 provided through the bottom of the tank 17 is closable by means of a stopper 45, having a stem 46 extending upwardly through a bracket 47 secured to a wall of the tank 17.

Pins 48 and 49, and links 50 loosely connect the stopper 45 to the arm 11.

In operation when the tank is empty the stopper 45 drops into and closes the orifice 44.

Water is supplied to the valve 28 through the hose connector 34 by means of a hose or other conveying means not shown. Similarly, a hose or other conveying means not shown, is connected to the hose connector 33 to supply water to a sprinkling system, for example, not shown.

When the arm 36 and the weight 39 are raised to the position shown by full lines in Fig. 1, a pin 51 carried by the sleeves 20 strikes the pins 21 and thereby turns the shaft 13 and the valve-stem 25 to open the valve 28 permitting water to flow through the pipe 29. The pin 51 is fixed in a pair of bosses 52 integral with the sleeves 20 in the identical manner that the pin 24 is fixed in the bosses 23.

The valve 32 is opened to permit water from the pipe 29 to enter the tank 17.

The time required for filling the tank 17 is also the time desired for the sprinkling system, for example, to be supplied with water. It is determined by the volume of flow permitted to pass through the valve 32. Obviously, a dripping of water into the tank 17 would require a longer period of time to fill the tank than it would require were the valve 32 opened to let out a larger volume of water.

When the tank is filled, the float 10 will be at the approximate position shown by broken lines, and thereby lowering the arm 15 to the position likewise shown by broken lines, whereupon the weight 40 will travel toward the hook 16, and this in turn will cause the arm 15 to lower, thereby in turn raising the float 10 higher and the stopper 45 will be pulled out of the orifice 44 by means of the pins 48 and 49, and the links 50, permitting the tank 17 to empty.

When the float 10 is thus raised by the weight 40, the arm 11 will engage the pin 24 and will cause the sleeves 20 to rotate clockwise as seen in Fig. 1.

The weight 39 is balanced over the center of the shaft 13, wherefore only a slight movement of the sleeves 20 is required to cause the weight 39 to fall toward the broken line position shown in Fig. 1. As the weight falls toward the broken line position, the pin 24 will engage the pin 21 and thereby turn the shaft 13 and the valve-stem 25 to turn the valve 28 to stop the flow of water to the sprinkling system, for example, and to the valve 32.

A small clearance will be noted in the drawings between the pin 24 and the pins 21. This permits the weight 40 to rotate the sleeves 20 freely for a short distance and thereby permitting the weight 39 to start its fall before assuming the task of turning the valve-stem 25.

The invention may readily be produced from materials the market affords and at no great cost. It is thoroughly reliable for the objectives claimed, practically fool-proof, and requires no attention once started. The water flow will continue to flow to the sprinkling system, for example, for the predetermined period to which the tank flow is adjusted; and at the expiration of that period, will automatically shut off all further supply to the system.

I am aware that changes in structure as herein disclosed may from time to time suggest themselves without departing, however, from the scope of the structural characteristics herein set forth. Hence, it is intended that the description and drawings of my present invention shall be interpreted as illustrative and not in a limiting sense. What I do claim, however, and desire to secure by Letters Patent, is:

1. In a mechanism for controlling the flow of liquid from a supply line to a service point; a pipe adapted to be connected between said line and said point, a main valve operable in said pipe line to start and stop the flow therethrough, a timing tank associated with said pipe line; a valve discharge member in said pipe adjustable for varying the rate of flow of liquid from said pipe into said tank when said main valve is opened; a discharge opening in said tank; a normally closed discharge valve controlling said opening; a rock shaft on said tank; means connecting said main valve and said shaft for opening and closing said main valve responsive to the turning of said shaft; a sleeve member mounted on said shaft for limited turning movement relative thereto, coacting drive pins on said sleeve member and said shaft for turning said shaft responsive to turning of said sleeve; an angular crank member fixed at one end to said sleeve member so that when swung into a predetermined elevated position the sleeve member and shaft will be turned to open said main valve, and when swung into a predetermined lowered position, the sleeve member and shaft will be turned to close said main valve; a weight slidable on said crank member so that when the crank member is moved into said elevated position the weight will slide into a balanced position intermediate the ends of said crank member to hold it in said elevated position to open said main valve and when the crank member is tilted out of said elevated position the weight will overbalance and slide along said crank member and swing it into said predetermined lowered position to close said main valve; a float-controlled means operating responsive to the liquid discharged from said pipe into said tank to a predetermined level therein, for turning said sleeve member and tilting said crank member to a position in which the weight will swing the crank member into said lowered position to close said main valve, and means responsive to said float-controlled means for opening said tank discharge valve and emptying said tank.

2. In a mechanism for controlling the flow of liquid from a supply line to a service point; a pipe adapted to be connected between said line and said point; a main valve operable in said pipe line to start and stop the flow therethrough; a timing tank associated with said pipe; a valve discharge member in said pipe adjustable for varying the rate of flow of liquid from said pipe into said tank when said main valve is opened; a discharge opening in said tank; a normally closed discharge valve controlling said opening; a rock shaft on said tank; means connecting said main valve and said shaft for opening and closing said main valve responsive to the turning of said shaft; a sleeve member mounted on said shaft for limited turning movement relative thereto, coacting drive pins on said sleeve member and said shaft for turning said shaft responsive to turning of the said sleeve; an angular crank member fixed at one end to said sleeve member so that when swung into a predetermined elevated position the sleeve member and shaft will be turned to open said main valve, and when swung into a predetermined lowered position, the sleeve member and shaft will be turned to close said main valve; a weight slidable on said crank member so that when the crank member is moved into said elevated position the weight will slide into a balanced position intermediate the ends of said crank member to hold it in said elevated position to open said main valve and when the crank member is tilted out of said elevated position the weight will overbalance and slide along said crank member and swing it into said predetermined lowered position to close said main valve; a float-controlled means operating responsive to the liquid discharged from said pipe into said tank to a predetermined level therein for turning said sleeve member and tilting said crank member to a position in which the weight will swing the crank member into said lowered position to close said main valve, means responsive to said float-controlled means for opening said tank discharge valve for emptying said tank, said float-controlled means including a float supporting arm mounted to turn freely on said shaft, a float supported by said arm within said tank; a weight-supporting arm joined to the portion of the float-supporting arm which is mounted on said shaft; a weight slidable on said weight-supporting arm; said float-supporting arm being disposed to contact one of the pins on said sleeve member and turn said sleeve member for tilting said crank member to overbalance it when the float reaches a predetermined level in said tank; said weight-supporting arm being arranged to support the weight adjacent the shaft when the float is below said predetermined level and when said float rises past said predetermined level to be moved to a position causing said arm-supported weight to slide and swing the weight-supporting arm and in turn the sleeve member and crank member downwardly, such downward movement of the crank member causing the weight supported thereby to slide and move the main valve to closed position upon contact of the drive pins on said sleeve member and shaft.

3. In a mechanism for controlling the flow of liquid from a supply line to a service point, a pipe adapted to be connected between said line and said point; a main valve operable in said pipe line to start and stop the flow therethrough; a timing tank associated with said pipe; a valve discharge member in said pipe adjustable for varying the rate of flow of liquid from said pipe into said tank when said main valve is opened; a discharge opening in said tank; a normally closed discharge valve controlling said opening, a rock shaft on said tank, means connecting said main valve and said shaft for opening and closing said main valve responsive to the turning of said shaft; a sleeve member mounted on said shaft means for limiting turning movement of said sleeve member relative to said shaft, said means comprising coacting drive pins on said sleeve member and said shaft for turning said shaft responsive to turning of the said sleeve, an angular crank member fixed at one end to said sleeve member so that when swung into a predetermined elevated position the sleeve member and shaft will be turned to open said main valve, and when swung into a predetermined lowered position, the sleeve member and shaft will be turned to close said main valve; a weight slidable on said crank member so that when the crank member is moved into said elevated position the weight will slide into a balanced position intermediate the ends of said crank member to hold it in said elevated position to open said main valve and when the crank member is tilted out of said elevated position the weight will overbalance and slide along said crank member and swing it into said predetermined lowered position to close said main valve; a float-controlled means operating responsive to the liquid discharged from said pipe into said tank to a predetermined level therein for turning said sleeve member and tilting said crank member to a position in which the weight will swing the crank member into said lowered position to close said main valve; means responsive to said float-controlled means for opening said tank discharge valve for emptying said tank, said float-controlled means including a normally balanced weight means operative to tilt said crank member and overbalance it when a predetermined level of liquid is reached in said tank.

4. In a mechanism for controlling the flow of liquid from a supply line to a service point, a pipe adapted to be connected between said line and said point; a main valve operable in said pipe line to start and stop the flow therethrough; a timing tank associated with said pipe line; a valve discharge member in said pipe adjustable for varying the rate of flow of liquid from said pipe into said tank when said main valve is opened; a discharge opening in said tank, a normally closed discharge valve controlling said opening; a rock shaft on said tank; means connecting said main valve and said tank for opening and closing said main valve responsive to the turning of said shaft; a sleeve member mounted on said shaft for limited turning movement relative thereto; coacting drive pins on said sleeve member and said shaft for turning said shaft responsive to the turning of said sleeve, an angular crank member fixed at one end to said sleeve member so that when swung into a predetermined elevated position the sleeve member and shaft will be turned to open said main valve, and when swung into a predetermined lowered position, the sleeve member and shaft will be turned to close said main valve; a weight slidable on said crank member so that when the crank member is moved into said elevated position the weight will slide into a balanced position intermediate the ends of said crank member to hold it in said elevated position to open said main valve and when the crank member is tilted out of said elevated position the weight will overbalance and slide along said crank member and swing it into said predetermined lowered position to close said main valve; a float-controlled means operating responsive to the liquid discharged from said pipe into said tank to a predetermined level therein for turning said sleeve member and tilting said crank member to a position in which the weight will swing the crank member into said lowered position to close said main valve; means responsive to said float-controlled means for opening said tank discharge valve and emptying said tank, said crank member, said sleeve member and float-controlled means being constructed and arranged so that the mechanism may be reset for another operation by manually lifting said crank member into said predetermined elevated position.

5. In a mechanism for controlling the flow of liquid from a supply line to a service point; a pipe adapted to be connected between said line and said point, a main valve operable in said pipe line to start and stop the flow therethrough; a timing tank associated with said pipe line; a valve discharge member in said pipe adjustable for varying the rate of flow of liquid from said pipe into said tank when said main valve is opened; a discharge opening in said tank, a normally closed discharge valve controlling said opening, a rock shaft on said tank, means connecting said main valve and said tank for opening and closing said main valve responsive to the turning of said shaft; a sleeve member mounted on said shaft for limited turning movement relative thereto, a drive connection between said sleeve member and said shaft for turning said shaft responsive to the turning of said sleeve, an angular crank member fixed at one end to said sleeve member so that when swung into a predetermined elevated position the sleeve member and shaft will be turned to open said main valve, and when swung into a predetermined lowered position, the sleeve member and shaft will be turned to close said main valve; a weight slidable on said crank member so that when the crank member is moved into said elevated position the weight will slide into a balanced position intermediate the ends of said crank member to hold it in said elevated position to open said main valve and when the crank member is tilted out of said elevated position the weight will overbalance and slide along said crank member and swing it into said predetermined lowered position to close said main valve; a float-controlled means operating responsive to the liquid discharged from said pipe into said tank to a predetermined level therein for turning said sleeve member and tilting said crank member to a position in which the weight will swing the crank member into said lowered position to close said main valve; means responsive to said float-controlled means for opening said tank discharge valve and emptying said tank, said crank member, said sleeve member and float-controlled means being constructed and arranged so that the mechanism may be reset for another operation by manually lifting said crank member into said predetermined elevated position.

JOHN D. SPENCE.

REFERENCES CITED

The following references are of record in the file of this patent:

UNITED STATES PATENTS

| Number | Name | Date |
|---|---|---|
| 640,497 | Staples | Jan. 2, 1900 |
| 654,441 | Cook | July 24, 1900 |
| 1,672,575 | McIntosh | June 5, 1928 |
| 2,267,492 | Burroughs | Dec. 23, 1941 |

Certificate of Correction

Patent No. 2,437,764.  March 16, 1948.

JOHN D. SPENCE

It is hereby certified that errors appear in the printed specification of the above numbered patent requiring correction as follows: Column 1, line 33, for the word "descent" read *descend*; column 2, line 27, for "is bent" read *are bent*; and that the said Letters Patent should be read with these corrections therein that the same may conform to the record of the case in the Patent Office.

Signed and sealed this 11th day of May, A. D. 1948.

[SEAL]

THOMAS F. MURPHY,
*Assistant Commissioner of Patents.*